United States Patent [19]

Röhm

[11] 4,065,139
[45] Dec. 27, 1977

[54] DRILL CHUCK

[76] Inventor: Günter Horst Röhm, Heinrich-Rohm-Str. 50, Sontheim, Germany, 7927

[21] Appl. No.: 704,045

[22] Filed: July 9, 1976

[30] Foreign Application Priority Data

July 29, 1975 Germany .............................. 7524037

[51] Int. Cl.² .............................................. B21B 31/04
[52] U.S. Cl. .................................... 279/62; 279/1 ME
[58] Field of Search .................... 279/1 B, 1 R, 60, 61, 279/62, 1 ME

[56] References Cited

U.S. PATENT DOCUMENTS 3,810,642  5/1974  Derbyshire .................. 279/1 ME X
3,949,998  4/1976  Dietzen et al. .............. 279/1 ME X Primary Examiner—Willie G. Abercrombie
Attorney, Agent, or Firm—Karl F. Ross

[57] ABSTRACT

A drill chuck of the key or Jacobs type comprising a chuck body guiding a plurality of chuck jaws toward and away from one another with axial displacement of the jaws by a gear ring whose teeth mesh with the Jacobs key. The toothed ring is formed with a groove in which a sleeve into which an inwardly projecting ridge of a sleeve is form-fittingly driven in the assembly of the chuck, the sleeve retaining the ring and another chuck member in axially fixed relation, this other chuck member being provided with an internally threaded bore for mounting upon a drill or other machine tool spindle. Directly opposite the shoulder formed by the groove in the toothed ring, the sleeve is provided with an inwardly open circumferential groove to facilitate plastic deformation of the sleeve into the groove of the ring.

2 Claims, 3 Drawing Figures

4,065,139

DRILL CHUCK

FIELD OF THE INVENTION

The present invention relates to a Jacobs-type chuck and, more particularly, to a key-operated drill chuck adapted to be mounted upon a spindle of a machine tool such as a drill.

BACKGROUND OF THE INVENTION

A Jacobs or like key-operated chuck can comprise a chuck body formed with a forwardly tapered face along which a plurality, usually three, chuck jaws are slidably guided so as to move together as the jaws are advanced forwardly and move apart as they are retracted, thereby enabling them to grip or release a drill shank or other tool.

A toothed ring (gear crown) is rotatably mounted on this body and operatively connected to the jaws so that its rotation relative to the body by the chuck key can tighten the jaws on the tool or enable the release of the latter. The teeth of this ring mesh with the teeth of a pinion formed on the key which can have a projection received in a bore of the chuck body and designed to position the key for proper meshing engagement of its pinion with the teeth of the ring.

The chuck structure generally also comprises a further member serving for attachment of the chuck to the threaded spindle of a machine tool or drill. This member can be provided with an internal thread in which the spindle is received.

It has been proposed, see for example German Gebrauchsmuster No. 7,241,181, to provide a sleeve which connects the ring and this latter member and which can be externally knurled or milled to facilitate gripping when, for example, the operator wishes to mount the chuck upon the spindle or remove it therefrom. This sleeve serves to prevent axial displacement of the ring relative to the chuck body. The sleeve, in turn, is rotatable on the chuck body but should be axially immovable relative thereto.

It has been found to be advantageous to connect the toothed ring with the sleeve by providing the toothed ring with an outwardly open circumferential groove having a flank facing toward the front or shank-receiving part of the chuck and a further flank facing in the opposite direction. The ring can have a rim which is formed fittingly receiving in this groove and abuts these flanks. Assembly of the device is facilitated if the rim is at least deformed into an inwardly projecting ridge after the rim has been positioned in line with the groove. The forwardly facing flank forms a shoulder which retards axial separation of the ring from the sleeve by a forward movement of the ring or a rearward movement of the sleeve.

Advantageously, the rim of the sleeve is provided with a conical surface or taper which facilitates deformation of the sleeve to provide the ridge which sits in the groove. Thus, the sleeve can be forced over the ring until the rim abuts against the rearwardly facing flank, whereupon an inward deformation or clinching of the sleeve drives the rim into form-fitting relationship with the groove and forms the aforementioned ridge. The tool which is used for this purpose need only have the proper inclination to suitably press the sleeve into the groove.

Such chucks have been found to be highly effective, inexpensive and of low cost. Although some difficulties have been encountered in the pressing of the rim of the sleeve behind the aforementioned shoulder of the toothed ring. The difficulty is the nonreproducible seating of the rib formed by the deformation and the lack of sufficient precision of this rib. In other words, the seating of the rib within the toothed ring does not always occur with the desired degree of precision even though the same tool is used.

OBJECT OF THE INVENTION

It is the object of the invention to provide an improved chuck and method of making same whereby this disadvantage is obviated in a chuck structure of the aforementioned type.

SUMMARY OF THE INVENTION

This object is attained in accordance with the invention, by providing the sleeve internally, directly opposite the aforementioned shoulder with a further groove, preferably of circular cross section, at the junction of the frustoconical or tapered surface of the sleeve with the cylindrical surface thereof. Surprisingly, this shallow groove, in which the outer edge of the shoulder is received, renders the deformation of the rim precise, uniform and reproducible.

The groove is only sufficiently wide and deep that deformation of the rim in the region of the shoulder and over the entire circumference of the sleeve has precisely the same deformation characteristics for the sleeve material. The ridge which is formed by the compression of the rim is found to form a flank which abuts directly against the shoulder.

Surprisingly, this shallow internal groove which after deformation provides a recess receiving the edge of the shoulder, renders it possible to provide a precise coaxial and form-fitting ridge and groove connection between sleeve and ring which in all respects is uniform and reproducible. Assembly is greatly simplified.

BRIEF DESCRIPTION OF THE DRAWING

The above and other objects, features and advantages of the invention will become more readily apparent from the following description, reference being made to the enclosed drawing, in which.

SPECIFIC DESCRIPTION

Figure 1:
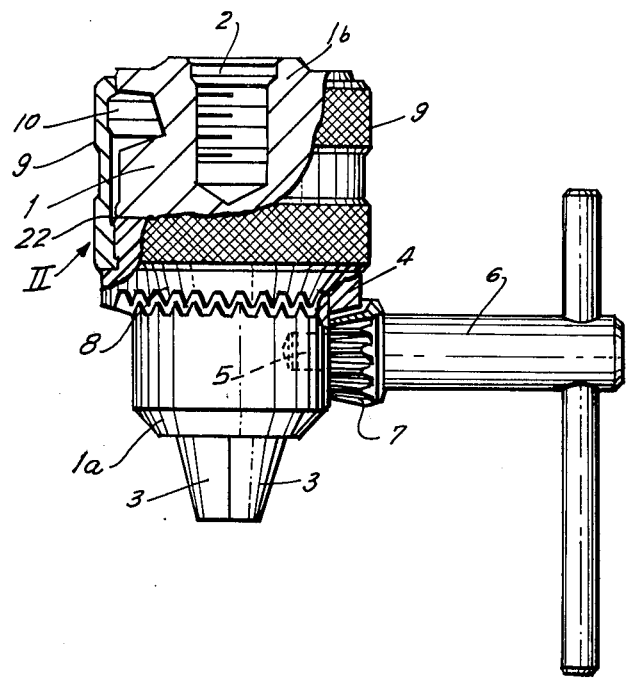
FIG. 1 is a vertical elevational view, partly broken away, of a chuck according to the invention.

FIG. 1 shows a chuck which comprises a chuck body 1 whose lower member 1a receives the jaws 3 and whose upper member 1b is provided with an internally threaded hole 2 adapted to receive the threaded spindle of a drill for other machine tools.

In the chuck body 1, the jaws 3 are displaceable, the jaws having an internal toothing which cooperates with a toothed ring 4 or gear crown to open and close the jaws. The mechanism for this purpose is described in German Gebrauchsmuster DT-GBM No. 7,241,181.

The toothed ring which is provided with an annular array of axially extending gear teeth 8 which mesh with the teeth of the bevel pinion 7 carried by a Jacobs chuck key 6 which has a projection received in an opening 5 formed in the chuck body 1.

By rotating the key 6, the ring 4 is rotated about the axis of the chuck to open and close the jaws by causing them to move along inclined guides in an axial direction.

The ring 4 is held axially on the body by a guide sleeve 9 which is rotatably connected at 10 to the body 1 but is axially movable thereon.

Figures 2, 3:
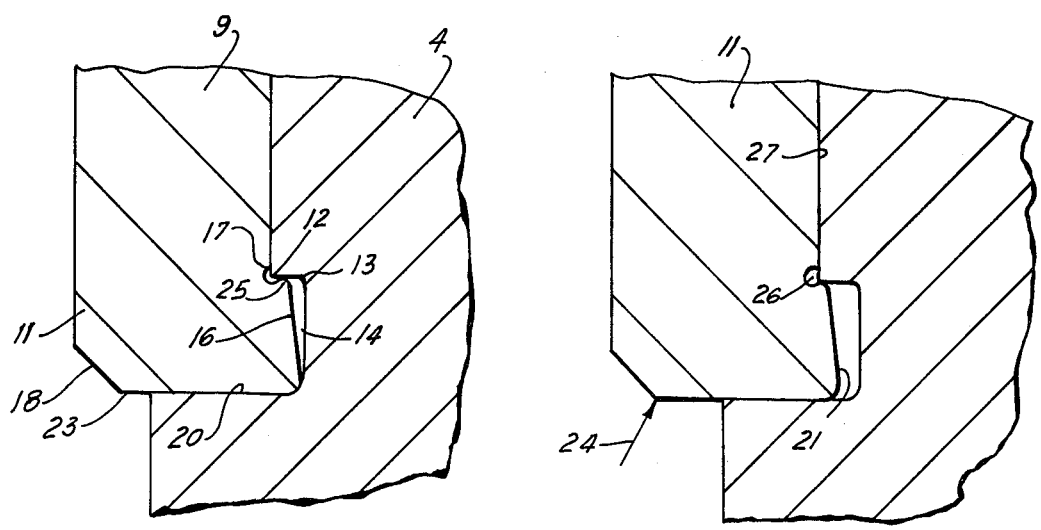
FIG. 2 is a detail view of the region II of FIG. 1.
FIG. 3 is a view of the portion shown in FIG. 2 prior to deformation according to the invention.

For a form-fitting connection of this sleeve 9 with the toothed ring 4, the latter is formed along its exterior with an outwardly open groove 14. The latter has a forwardly turned flank 13 defining a shoulder whose edge is represented at 12 (FIG. 2) and a rearwardly facing flank 20. The sleeve 11 is formed at its axially forward end 11 with a rim 21 which can be forced over the inclined edge 22 of the ring 4 to spring into the groove 14 and bring its forward face 23 into abutting relationship with the flank 20. By the application of pressure in the direction of arrow 24, the outer bevel 18 of the sleeve is formed and the sleeve is deformed into the groove 14 to form a ridge 16 whose upper face 25 directly abuts against the shoulder 12. In this case, the groove 14 acts as a die into which the sleeve material is plastically deformed.

When such operations are carried out without the improvement contributed by the invention, the deformation is irregular, imprecise and nonuniform, and frequently the sleeve is distorted, rotary movement is irregular and radial and axial play readily arise.

However, when a circumferential groove is formed at 26 at the junction between the rim 21 and the cylindrical wall 27 of the sleeve 11, the rim is more readily upset to form the ridge and the latter is more uniform and able to form-fittingly engage the shoulder 13 than heretofore. As is apparent from FIGS. 2 and 3, the edge 12 of the shoulder is received in and partly enclosed by the recess 17 which remains after deformation and results from the groove 26. A slight bevel may be provided at 18 before deformation of the sleeve to facilitate positioning of the upsetting tool.

I claim:

1. A drill chuck comprising:
   a substantially cylindrical chuck body having a forward end and a rearward end, said body being provided with means at said rearward end for attaching said body to a spindle and with jaws at said forward end for engaging a tool;
   an externally toothed substantially cylindrical ring rotatable on said body about an axis for displacing said bodies to grip and release said tool, said ring being provided with an externally open circumferential groove defined between a forwardly-facing flank forming a shoulder with an outer edge and a rearwardly facing flank, said flanks lying in planes perpendicular to the axis; and
   a sleeve coaxially surrounding said body and having a forward end abutting said rearwardly-facing flank and an internally projecting circumferential ridge form-fittingly received in said groove and bearing upon said shoulder, said sleeve being provided with an internal groove of substantially circular section receiving said edge.

2. A method of assembling a chuck comprising the steps of:
   forming a sleeve with an internal circumferential groove spaced from a forward end thereof;
   fitting said sleeve over an externally toothed ring having an external circumferential groove defined between a rearwardly-facing flank and a forwardly-facing flank constituting a shoulder having an edge so that said end rests against said rearwardly-facing flank and said internal groove is juxtaposed with said shoulder, said ring being mounted on a chuck body for actuation of chuck bodies carried thereby; and
   upsetting said end of said sleeve into said external groove, thereby substantially enclosing said edge in said internal groove.

* * * * *